(12) United States Patent
Pang et al.

(10) Patent No.: US 10,935,421 B2
(45) Date of Patent: Mar. 2, 2021

(54) LIGHT INTENSITY DETECTION METHOD AND APPARATUS, AND INTELLIGENT TERMINAL

(71) Applicant: SHENZHEN GOODIX TECHNOLOGY CO., LTD., Guangdong (CN)

(72) Inventors: Shu Pang, Guangdong (CN); Gengchun Deng, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 569 days.

(21) Appl. No.: 15/797,975

(22) Filed: Oct. 30, 2017

(65) Prior Publication Data

US 2018/0306640 A1    Oct. 25, 2018

Related U.S. Application Data

(63) Continuation of application No. PCT/CN2017/081150, filed on Apr. 19, 2017.

(51) Int. Cl.
*G01J 1/42* (2006.01)
*G06F 3/042* (2006.01)
(Continued)

(52) U.S. Cl.
CPC .......... *G01J 1/4204* (2013.01); *G01J 1/0219* (2013.01); *G01J 1/0228* (2013.01); *G01J 1/0233* (2013.01);
(Continued)

(58) Field of Classification Search
CPC ...... G01J 1/4204; G01J 1/0219; G01J 1/0228; G01J 1/0233; G01J 1/0247; G01J 1/0271;
(Continued)

(56) References Cited

U.S. PATENT DOCUMENTS

2005/0281475 A1    12/2005    Wilson
2010/0156850 A1    6/2010    Kurokawa
(Continued)

FOREIGN PATENT DOCUMENTS

CN    104318199 A    1/2015
CN    104598899 A    5/2015
(Continued)

OTHER PUBLICATIONS

Extended Search Report issued in corresponding European patent application No. 17784522.9 dated Apr. 11, 2018.
(Continued)

*Primary Examiner* — Georgia Y Epps
*Assistant Examiner* — Don J Williams
(74) *Attorney, Agent, or Firm* — Heslin Rothenberg Farley & Mesiti P.C.

(57) ABSTRACT

A light intensity detection method includes: determining whether light intensity detection needs to be performed; detecting whether there is a finger touch in an optical detection region of an optical fingerprint sensor if light intensity detection needs to be performed, wherein the optical detection region is located in at least one part of a display region of a display; enabling a light intensity detection function if no finger touch is detected, and collecting light intensity data by using the optical fingerprint sensor; and processing the collected light intensity data, and calculating a value of current ambient light intensity according to the light intensity data.

16 Claims, 10 Drawing Sheets

(51) Int. Cl.
  *G01J 1/02* (2006.01)
  *G01J 1/16* (2006.01)
  *G06K 9/00* (2006.01)
(52) U.S. Cl.
  CPC ............ *G01J 1/0247* (2013.01); *G01J 1/0271* (2013.01); *G01J 1/1626* (2013.01); *G06F 3/042* (2013.01); *G06F 3/0421* (2013.01); *G06K 9/0004* (2013.01); *G09G 2360/144* (2013.01); *H04M 2250/12* (2013.01)
(58) Field of Classification Search
  CPC ...... G01J 1/1626; G06F 3/042; G06F 3/0421; G06K 9/0004; G09G 2360/144; H04M 2250/12
  See application file for complete search history.

(56) References Cited

U.S. PATENT DOCUMENTS

| | | | |
|---|---|---|---|
| 2014/0192023 A1* | 7/2014 | Hoffman | G06F 3/0423 345/175 |
| 2015/0286306 A1 | 10/2015 | Abrams et al. | |
| 2015/0348504 A1 | 12/2015 | Sakariya et al. | |
| 2015/0364107 A1 | 12/2015 | Sakariya et al. | |
| 2016/0371554 A1 | 12/2016 | Lee et al. | |

FOREIGN PATENT DOCUMENTS

| | | |
|---|---|---|
| CN | 105184248 A | 12/2015 |
| CN | 105224850 A | 1/2016 |
| CN | 105590045 A | 5/2016 |
| CN | 106526944 A | 3/2017 |
| CN | 106547309 A | 3/2017 |
| CN | 106549075 A | 3/2017 |
| CN | 107077554 A | 8/2017 |
| CN | 107223203 A | 9/2017 |
| EP | 2281889 A1 | 7/2013 |
| WO | 2004066194 A1 | 8/2004 |
| WO | 2016154378 A1 | 9/2016 |

OTHER PUBLICATIONS

Communication pursuant to Article 94(3) EPC, issued by European Patent Office for European Application No. 17784522.9, dated Jan. 4, 2019.
Chinese Office Action for Chinese Patent Application No. 201810354684.3 dated Mar. 18, 2020.
International Search Report issued in PCT/CN2017/081150 dated Dec. 28, 2017.

* cited by examiner

LIGHT INTENSITY DETECTION METHOD AND APPARATUS, AND INTELLIGENT TERMINAL

CROSS-REFERENCE TO RELATED APPLICATION

The present application is a continuation of international application No. PCT/CN2017/081150, filed on Apr. 19, 2017, which is hereby incorporated by reference herein, in its entirety.

TECHNICAL FIELD

This application relates to the field of light intensity detection technologies, and in particular, to a light intensity detection method and apparatus, and an intelligent terminal.

BACKGROUND

A light sensor for detecting ambient light intensity is generally arranged in an existing mobile terminal, so that a handheld device can automatically adjust a screen brightness value thereof according to the ambient light intensity. This brings better visual effects to users, and reduces power consumption to some extent. Referring to FIG. 1, FIG. 1 is a schematic diagram of a mobile terminal (using a mobile phone as an example). The mobile terminal includes a receiver, a camera, a light sensor, a fingerprint sensor, and a display 25. To better detect ambient light intensity, the light sensor 23 is generally located above the display 25 of the mobile terminal.

Currently, mobile terminal manufacturers are trying to increase a screen-to-body ratio of a mobile terminal (that is, a ratio of a screen area to an area of a front panel of a mobile phone) terminal, to improve experience and visual effects when users use the mobile terminal. In this case, if the light sensor 23 is still arranged above the display of the mobile terminal as illustrated in FIG. 1, the increase of the screen-to-body ratio of the mobile terminal is inevitably limited.

SUMMARY

Some embodiments of this application are intended to provide a light intensity detection method and apparatus, and an intelligent terminal, so as to integrate an optical fingerprint sensor below a display, and implement a light intensity detection function by using the optical fingerprint sensor. Therefore, there is no need to additionally provide a light sensor in the intelligent terminal, which might otherwise occupy an area of a front surface of a housing, and accordingly, so as to help to increase a screen-to-body ratio of the intelligent terminal can be increased.

An embodiment of this application provides a light intensity detection method. The light intensity detection method includes: determining whether light intensity detection needs to be performed; detecting whether there is a finger touch on an optical detection region of an optical fingerprint sensor if light intensity detection needs to be performed, wherein the optical detection region is located in at least one part of a display region of a display; enabling a light intensity detection function if no finger touch is detected, and collecting light intensity data by using the optical fingerprint sensor; and processing the collected light intensity data, and calculating a value of current ambient light intensity according to the light intensity data.

An embodiment of this application further provides a light intensity detection apparatus. The light intensity detection apparatus includes a display, an optical fingerprint sensor, and a main control unit, wherein an optical detection region of the optical fingerprint sensor is located in at least one part of a display region of the display; when the main control unit determines that light intensity detection needs to be performed, if there is no finger touch in the optical detection region of the display, the main control unit enables a light intensity detection function of the optical fingerprint sensor; and the optical fingerprint sensor is configured to collect light intensity data after the light intensity detection function is enabled, and upload the light intensity data to the main control unit to calculate a value of current ambient light intensity.

An embodiment of this application further provides an intelligent terminal, including the foregoing light intensity detection apparatus.

Compared with the existing art, in the embodiments of this application, an optical fingerprint sensor is arranged below a display, and a light intensity detection function is implemented by using the optical fingerprint sensor. Therefore, there is no need to additionally provide a light sensor in the intelligent terminal, which might otherwise occupy an area of a front surface of a housing, and accordingly, so as to help to increase a screen-to-body ratio of the intelligent terminal can be increased.

In addition, in the light intensity detection method, before the enabling the light intensity detection function, the method further includes: waking up the optical fingerprint sensor, to enable the light intensity detection function of the optical fingerprint sensor, wherein the optical fingerprint sensor has both a fingerprint detection function and the light intensity detection function. In this embodiment, the optical fingerprint sensor is woken up when light intensity detection can be performed, thereby reducing power consumption of a terminal.

In addition, in the light intensity detection method, after the enabling the light intensity detection function and collecting light intensity data, the method further includes: controlling the optical fingerprint sensor to enter a power saving mode. In this embodiment, after the optical fingerprint sensor collects the light intensity data, the optical fingerprint sensor is controlled to enter the power saving mode, thereby reducing power consumption of the terminal.

In addition, in the light intensity detection method, the processing the collected light intensity data, and calculating a value of current ambient light intensity according to the light intensity data includes: processing the collected light intensity data, and calculating a value of first light intensity according to the light intensity data; obtaining a brightness value of a current pattern displayed in a light intensity detection sub-region of the display, and calculating a value of second light intensity according to the brightness value of the current pattern, wherein the value of second light intensity indicates that the light intensity detection sub-region is affected by the brightness value of the current pattern; and calculating the value of ambient light intensity according to the value of first light intensity and the value of second light intensity. In this embodiment, a specific method for calculating the value of current ambient light intensity is described.

In addition, in the light intensity detection method, a value of the second light intensity P2 is calculated by: $P2=K*L$, $K$ is a predetermined coefficient corresponding to the display, and L is the brightness value of the current pattern. This embodiment provides the manner of calculating the value of the second light intensity.

In addition, in the light intensity detection method, the predetermined coefficient K corresponding to the display is determined by a manner including: displaying a pattern of predetermined brightness value on the display; measuring, by using a light intensity detector, a value of light intensity of the light intensity detection sub-region, the light intensity being generated by the light intensity detection sub-region due to being affected by the current pattern; and calculating the predetermined coefficient according to the measured light intensity and the predetermined brightness value. This embodiment provides a specific manner of predetermining the predetermined coefficient K.

In addition, in the light intensity detection method, the optical detection region of the optical fingerprint sensor includes a fingerprint detection sub-region and a light intensity detection sub-region, the optical fingerprint sensor performs the fingerprint detection function by using sensing units in the fingerprint detection sub-region, and performs the light intensity detection function by using at least one sensing unit in the light intensity detection sub-region. This embodiment describes the optical detection region of the optical fingerprint sensor.

In addition, in the light intensity detection method, the at least one sensing unit in the light intensity detection sub-region is independently arranged outside the fingerprint detection sub-region. This embodiment provides a solution of disposing the sensing unit in the light intensity detection sub-region.

In addition, in the light intensity detection method, at least some sensing units in the fingerprint detection sub-region are further used as sensing units in the light intensity detection sub-region, and the at least some sensing units have both the fingerprint detection function and the light intensity detection function. This embodiment provides another solution of disposing the sensing unit in the light intensity detection sub-region.

BRIEF DESCRIPTION OF THE DRAWINGS

One or more embodiments are exemplarily described with reference to figures in accompanying drawings corresponding to the one or more embodiments. The exemplary descriptions do not constitute limitation to the embodiments. In the accompanying drawings, elements with same numeral reference signs represent similar elements. Unless otherwise specified, the figures in the accompanying drawings do not constitute ratio limitation.

DETAILED DESCRIPTION

To make an objective, technical solutions, and advantages of this application clearer, the following further describes some embodiments of this application in detail with reference to the accompanying drawings and embodiments. It should be understood that, the specific embodiments described herein are merely intended for explaining this application, and are not for limiting this application.

A first embodiment of this application relates to a light intensity detection method, applied to an intelligent terminal including a display and an optical fingerprint sensor. An optical detection region of the optical fingerprint sensor is arranged in at least a part of a display region of the display. The intelligent terminal may be a mobile intelligent terminal device such as a mobile phone, a tablet computer or the like, or may be an intelligent electronic apparatus of another type.

More specifically, the display of the intelligent terminal may be a liquid crystal display (LCD), an organic light emitting diode (OLED) display, a micro-light emitting diode (Micro-LED) display, or a flat-panel display of another type. When the intelligent terminal is an intelligent mobile terminal device, the display may be a touch screen having both a touch function and a display function. For example, the display includes a touch sensor and a display. The touch sensor is installed above the display or integrated in the display. The optical fingerprint sensor may be integrally arranged with the display to form an under-display structure or an in-display structure. For example, the optical fingerprint sensor may be in a form of an independent functional module and directly arranged below a display region of the display; alternatively, the optical fingerprint sensor may be reuse some functions of the display (for example, using a self-luminous display pixel of the display as a light source).

In this embodiment, the intelligent terminal further includes a touch sensor. The touch sensor is installed above the display or is integrated in the display, and at least covers the optical detection region of the optical fingerprint sensor. An in-display light intensity detection middleware may be configured in an operating system, such that a main control unit of the intelligent terminal may interactively control a light intensity calculation module of the operating system, the touch sensor, and the optical fingerprint sensor.

Figure 1:
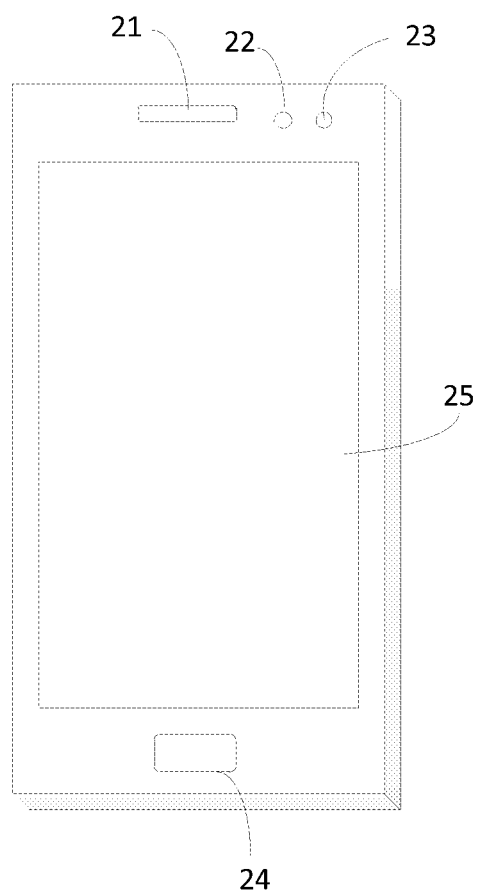
FIG. 1 is a schematic diagram of a mobile terminal in the existing art.
Figure 2A:
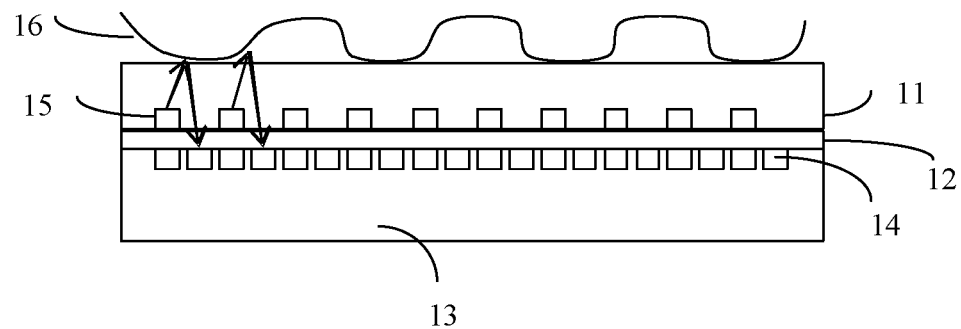
FIG. 2a is a schematic structural diagram of an optical fingerprint sensor according to a first embodiment of this application.
Figure 2B:
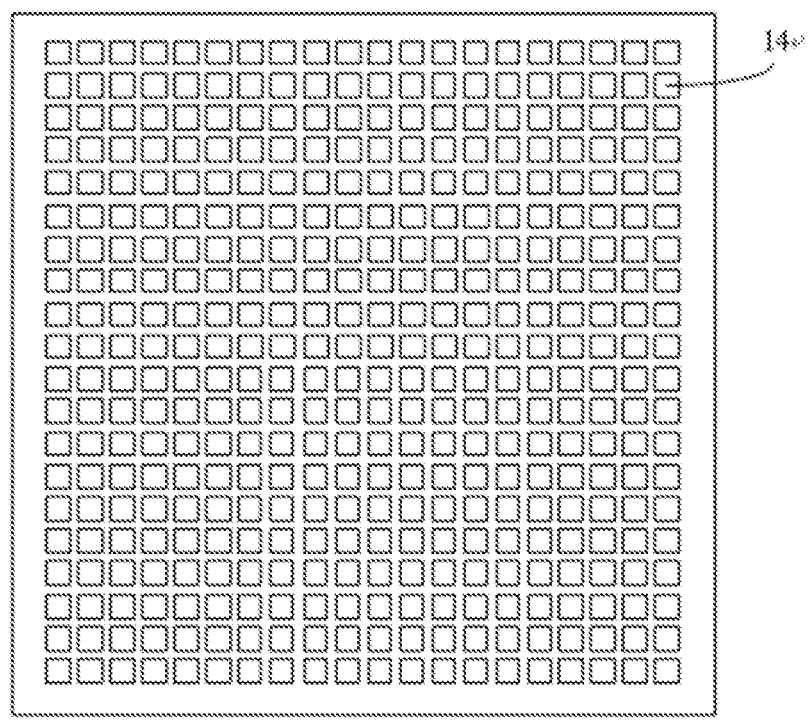
FIG. 2b is a schematic diagram of distribution of sensing units of an optical fingerprint sensor according to the first embodiment of this application.

In this embodiment, the optical fingerprint sensor may be an optical fingerprint sensor having a light intensity detection function. That is, a light sensor is integrated in the optical fingerprint sensor. The optical fingerprint sensor is a sensor for performing identity identification on a basis of a fingerprint. Referring to FIG. 2a and FIG. 2b, FIG. 2a and FIG. 2b are respectively a schematic structural diagram of the optical fingerprint sensor of the intelligent terminal and a schematic diagram of distribution of sensing units of the optical fingerprint sensor. The intelligent terminal includes an OLED display 11, an optical filter 12, and a fingerprint sensor chip 13. A plurality of OLED light sources (that is, OLED display pixel units) 15 is included in the OLED display 11, which is used as a display screen of the intelligent terminal. The optical filter 12 is arranged between the OLED display 11 and the fingerprint sensor chip 13, and is mainly used for filtering. The fingerprint sensor chip 13 includes a plurality of sensing units 14. The sensing units may be referred to as detection pixels.

When a user touches a surface of the OLED display 11 of the intelligent terminal by using a finger 16, a light ray emitted by an OLED light source of the OLED display 11 is reflected on a surface of the finger 16. The reflected light passes through the optical filter 12 and is received by the sensing units 14 of the fingerprint sensor chip 13. Each of the sensing units 14 may convert a value of light intensity of the received reflected light to a corresponding current value. Because light intensity of the reflected light corresponds to different texture depths of a fingerprint is different, a light intensity of the reflected light received by the sensing unit 14 can indicate texture depth information of the fingerprint. The fingerprint sensor chip 14 includes thousands of sensing units arranged as a matrix. When the finger 16 touches the sensor, a depth information matrix output by all the sensing units 14 indicates texture information of the finger 16.

In this embodiment, the light sensor is integrated in the optical fingerprint sensor, so that the optical fingerprint sensor has both a fingerprint detection function and a light intensity detection function. Specifically, the optical fingerprint sensor has an optical detection region; and the optical detection region includes a fingerprint detection sub-region and a light intensity detection sub-region. The fingerprint detection sub-region includes a plurality of sensing units configured to perform the fingerprint detection function; and the light intensity detection sub-region includes at least one sensing unit configured to perform the light intensity detection function. The optical fingerprint sensor emits detection light rays by using at least some pixel units of the display as light sources. When the light intensity detection function is implemented, the sensing unit in the light intensity detection sub-region receives the ambient light; and when the fingerprint detection function is implemented, the sensing units in the fingerprint detection sub-region receive the returned light rays.

In this embodiment, three optional solutions of performing light intensity detection by using the optical fingerprint sensor are provided as follows. Detection principles of the three solutions are essentially the same. In a first implementation, some sensing units (at least one) in the fingerprint detection sub-region form a light intensity detection sub-region for light intensity detection. Specifically, the sensing units in the light intensity detection sub-region are integrated in the fingerprint detection sub-region. That is, the at least some sensing units in the fingerprint detection sub-region are further used as sensing units in the light intensity detection sub-region. The at least some sensing units have both the fingerprint detection function and the light intensity detection function. In a second implementation, at least one sensing unit in the light intensity detection sub-region is independently arranged outside the fingerprint detection sub-region, and is configured to perform light intensity detection independently. Specifically, the sensing unit (that is, a light intensity detection unit) in the light intensity detection sub-region may be arranged outside the fingerprint detection sub-region, and is adjacent to a sensing unit in an outermost region of the fingerprint detection sub-region. In addition, a sensing unit in the light intensity detection sub-region and a sensing unit (that is, a fingerprint detection unit) in the fingerprint detection sub-region are independent of each other in both structure and function. In a third implementation, some sensing units in the fingerprint detection sub-region are selected as light intensity detection units, and at least one sensing unit is additionally arranged outside the fingerprint detection sub-region as light intensity detection units, so as to form the light intensity detection sub-region for light intensity detection. However, the solution is not limited to the foregoing three solutions.

Figure 3:
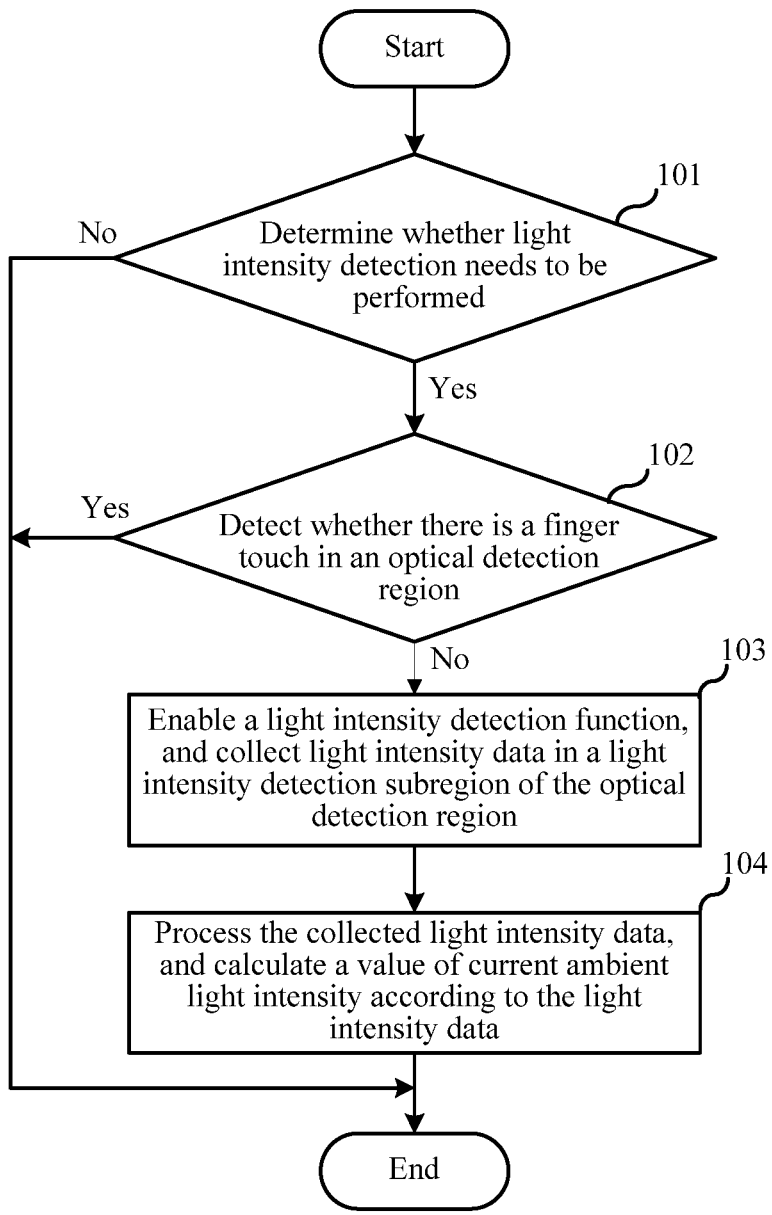
FIG. 3 is a specific flowchart of a light intensity detection method according to the first embodiment of this application.

In this embodiment, a specific process of the light intensity detection method is shown in FIG. 3.

Step 101: whether light intensity detection needs to be performed is determined. If light intensity detection needs to be performed, step 102 is performed. If light intensity detection does not need to be performed, the process is ended directly.

Specifically, the main control unit of the intelligent terminal determines whether light intensity detection needs to be performed by using an application program in the operating system. Usually, the application program in the operating system sets a fixed time interval for light intensity detection. For example, if a time interval for light intensity detection is 10 s, the main control unit determines that light intensity detection needs to be performed every 10 s, and step 102 is performed.

In an optional implementation, in this embodiment, the main control unit controls light intensity detection of the optical fingerprint sensor by an in-display light intensity detection middleware configured in the operating system. It should be understood that, in another alternative implementation, the main control unit may control light intensity detection of the optical fingerprint sensor in another manner. This is not limited in this application.

Step 102: whether there is a finger touch in the optical detection region is detected. If there is a finger touch, step 103 is performed. If there is no finger touch, the process is ended directly.

Specifically, the in-display light intensity detection middleware may detect whether there is a finger touch in the optical detection region of the display in a predetermined time range by using the touch sensor or the optical fingerprint sensor. For example, in this embodiment, the optical fingerprint sensor may detect whether a light ray is blocked by a finger in the optical detection region by using the optical fingerprint sensor; or, detect whether reflected light is received, which is formed after light emitted by the OLED light source is reflected on a surface of the finger. Since the sensing units for performing fingerprint detection and the sensing units for performing light intensity detection are all integrated in the optical fingerprint sensor, that is, integrated in one chip, and in addition, the light intensity detection sub-region occupies a relatively small area of the optical detection region, even if a finger only touches the fingerprint detection sub-region, the finger may simultaneously block the light intensity detection sub-region. Therefore, in this embodiment, whether there is a finger touch in the optical detection region needs to be detected. If there is a finger touch, it is difficult to implement accurate light intensity detection.

When it is determined that there is no finger touch, it indicates that there is no finger touch in the optical detection region at this time. Therefore, light intensity detection may be performed, and step 103 is performed.

When it is determined that there is a finger touch, it indicates that a finger in the optical detection region may block a light ray, resulting in that light intensity detection cannot be performed. At this time, the user may perform an operation on a displayed content in the optical detection region of the display; or, the operating system receives a user fingerprint authentication request, and enables the fingerprint detection function of the optical fingerprint sensor. Sensing units for detecting a fingerprint in the optical fingerprint sensor are collecting fingerprint information, and uploading collected user fingerprint information to the operating system for identity authentication (that is, when user fingerprint information is collected, the finger of the user needs to touch the optical detection region, and therefore this is also a case in which there is a finger touch). In both of the foregoing two cases, light intensity detection cannot be performed, and thus light intensity detection is automatically abandoned. When light intensity detection needs to be performed next time, whether there is a finger touch in the optical detection region is detected again. If a time interval for light intensity detection is set to 10 s, after 10 s, whether there is a finger touch in the optical detection region is detected again.

Step 103: the light intensity detection function is enabled, and light intensity data is collected in the light intensity detection sub-region of the optical detection region.

Specifically, the optical fingerprint sensor has a plurality of functions. When it is detected that light intensity detection needs to be performed, and there is no finger touch in the optical detection region, the in-display light intensity detection middleware enables the light intensity detection function of the optical fingerprint sensor by the operating system, and collects light intensity data in the light intensity detection sub-region of the optical detection region by using corresponding sensing units. Generally, a frame of data in the light intensity detection sub-region is collected as light intensity data; or several frames of data are collected and then an average value is calculated accordingly to serve as light intensity data. This is not limited in this embodiment.

Step 104: the collected light intensity data is processed, and a value of current ambient light intensity is calculated according to the light intensity data.

Specifically, after collecting the light intensity data, the optical fingerprint sensor reports the light intensity data to the operating system. In addition, the operating system may process the light intensity data by using the light intensity calculation module, to calculate the value of current ambient light intensity according to the light intensity data. When the light intensity data is collected by a plurality of sensing units, an average value of light intensity is calculated according to the light intensity data collected by the plurality of sensing units, and the average value of light intensity is used as the value of current ambient light intensity.

Compared with the existing art, in this embodiment, an optical fingerprint sensor is arranged below a display, and a light intensity detection function is implemented by using the optical fingerprint sensor. Therefore, there is no need to additionally provide a light sensor in the intelligent terminal, which might otherwise occupy an area of a front surface of a housing, and accordingly, a screen-to-body ratio of the intelligent terminal can be increased.

A second embodiment of this application relates to a light intensity detection method. This embodiment is improved based on the first embodiment. The main improvement is that: in this embodiment, the optical fingerprint sensor is woken up when light intensity detection needs to be performed.

Figure 4:
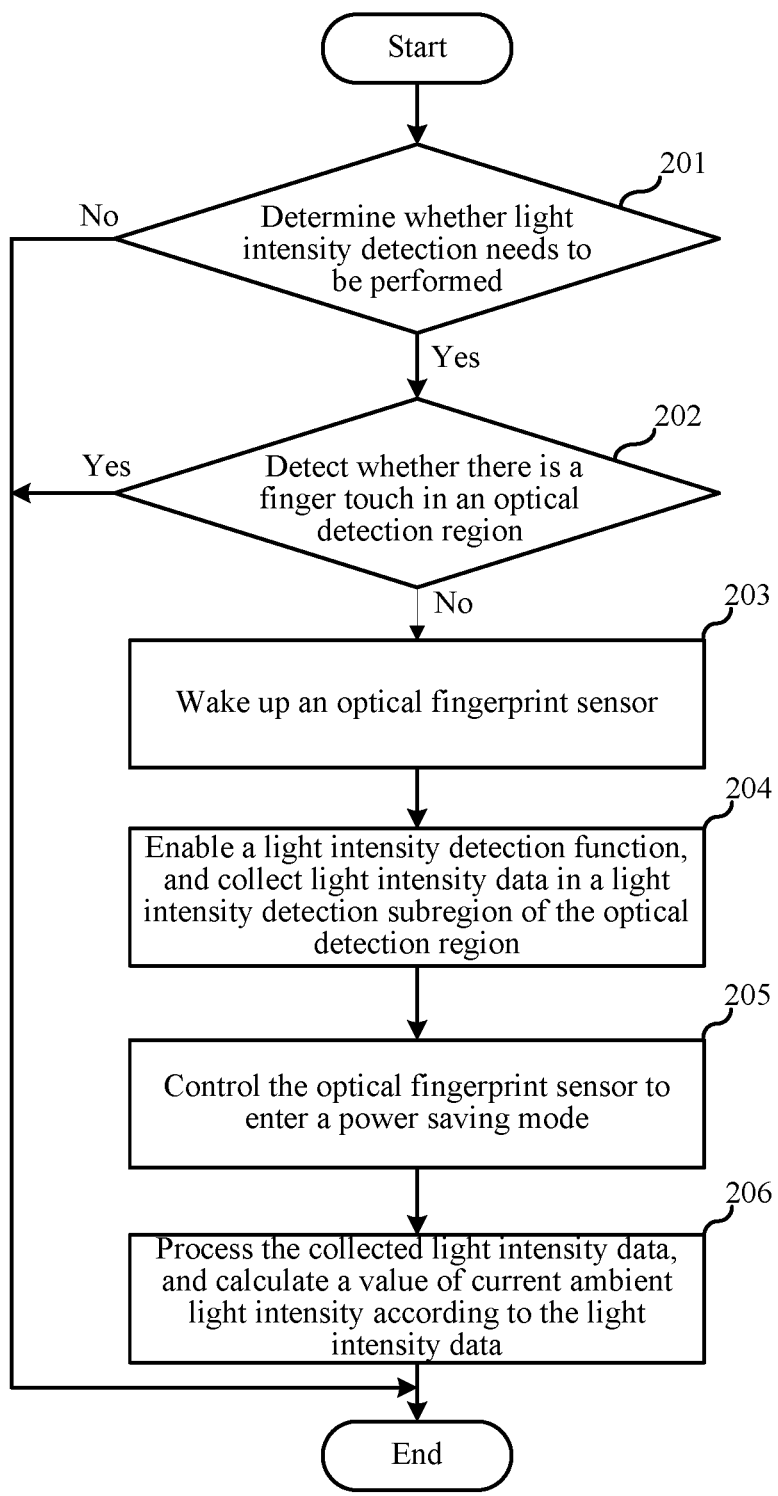
FIG. 4 is a specific flowchart of a light intensity detection method according to a second embodiment of this application.

In this embodiment, a specific process of the light intensity detection method is shown in FIG. 4.

Step 201 and step 202 are substantially the same as step 101 and step 102 respectively, step 204 and step 205 are substantially the same as step 103 and step 104 respectively, and details are not described herein again. A main difference is that: this embodiment further includes step 203 and step 205, specifically as follows.

Step 201: whether light intensity detection needs to be performed is determined. If light intensity detection needs to be performed, step 202 is performed. If light intensity detection does not need to be performed, the process is ended directly.

Step 202: whether there is a finger touch in the optical detection region is detected. If there is a finger touch, step 203 is performed. If there is no finger touch, the process is ended directly.

Step 203: the optical fingerprint sensor is woken up.

Specifically, in the intelligent terminal, the optical fingerprint sensor normally operates in a sleep mode; when light intensity detection or fingerprint detection needs to be performed, the optical fingerprint sensor is woken up to enable a corresponding function. When detecting, by using a touch sensor or the optical fingerprint sensor, that there is no finger touch in the optical detection region, the in-display light intensity detection middleware controls the optical fingerprint sensor in the intelligent terminal to be woken up, so as to enable the light intensity detection function of the optical fingerprint sensor, and the sensing unit in the optical fingerprint sensor are enabled to detect light intensity.

Step 204: the light intensity detection function is enabled, and light intensity data is collected in the light intensity detection sub-region of the optical detection region.

Step 205: the optical fingerprint sensor is controlled to enter a power saving mode.

Specifically, the sensing units for light intensity detection in the optical fingerprint sensor are enabled. After the sensing units collect light intensity data in the light intensity detection sub-region of the optical detection region and upload the light intensity data to the operating system, the in-display light intensity detection middleware controls the optical fingerprint sensor to enter the power saving mode, that is, controls the optical fingerprint sensor to enter the sleep mode.

Step 206: the collected light intensity data is processed, and a value of current ambient light intensity is calculated according to the light intensity data.

It should be noted that, alternatively, step 205 may be performed after step 206. That is, the optical fingerprint sensor is controlled to enter the power saving mode after the light intensity calculation module processes the light intensity data, and calculates the value of current ambient light intensity according to the light intensity data. This is not limited in this embodiment.

Compared with the first embodiment, in this embodiment, the optical fingerprint sensor is woken up when light intensity detection can be performed, and after the optical fingerprint sensor collects the light intensity data, the optical fingerprint sensor is controlled to enter the power saving mode, thereby reducing power consumption of the terminal.

A third embodiment of this application relates to a light intensity detection method. This embodiment is detailed based on the second embodiment. The main detailed part in this embodiment is step 306, which provides a detailed description on step 206 of processing the collected light intensity data and calculating a value of current ambient light intensity according to the light intensity data.

Figure 5:
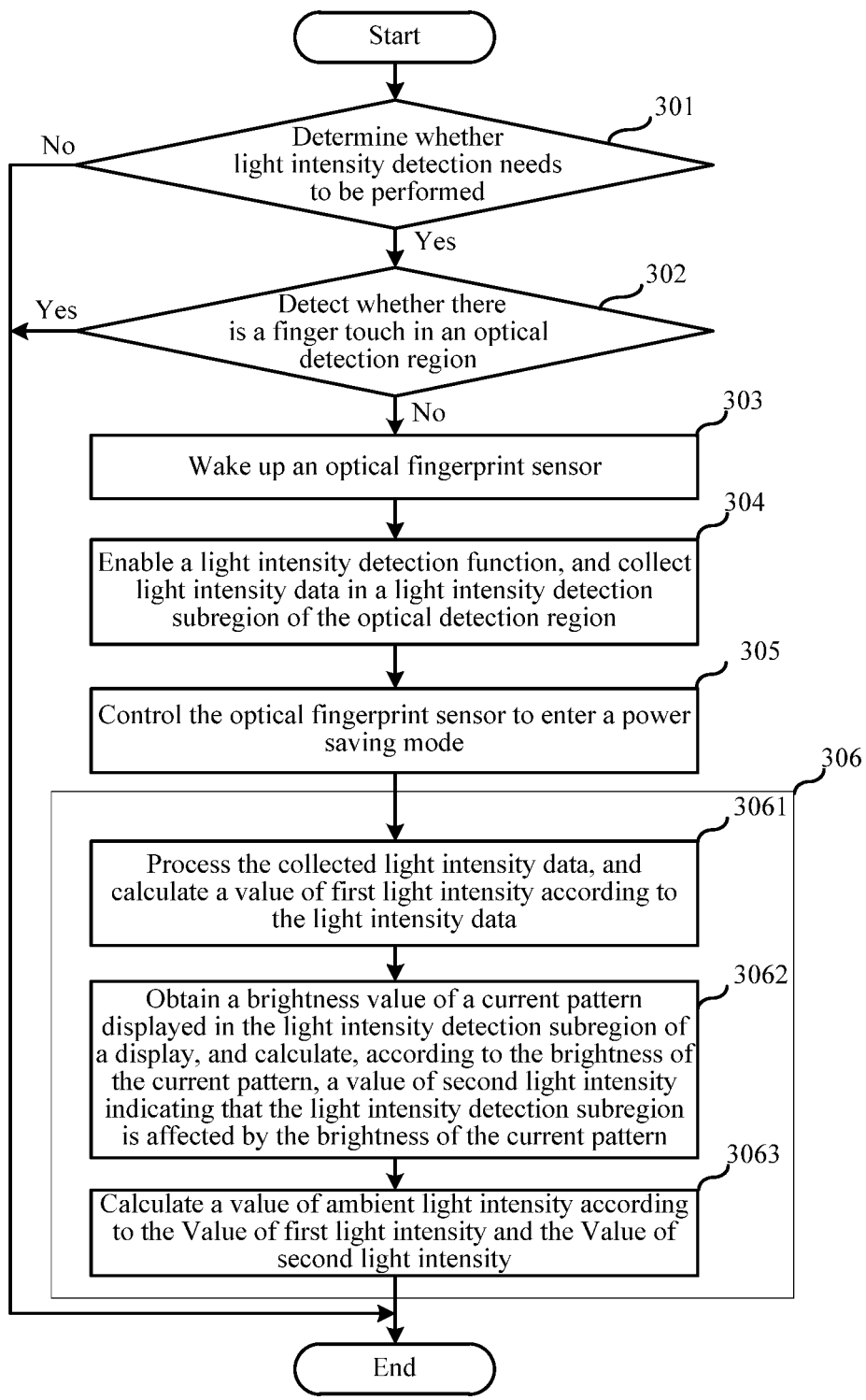
FIG. 5 is a specific flowchart of a light intensity detection method according to a third embodiment of this application.

In this embodiment, a specific process of the light intensity detection method is shown in FIG. 5.

Step 301 to step 305 are substantially the same as step 201 to step 205 respectively, and details are not described herein again. The main difference is that: in this embodiment, step 306 of processing the collected light intensity data, and calculating a value of current ambient light intensity according to the light intensity data specifically includes:

Sub-step 3061: the collected light intensity data is processed, and a value of first light intensity is calculated according to the light intensity data.

Specifically, the operating system may process, by using the light intensity calculation module, the light intensity data collected by the optical fingerprint sensor in the light intensity detection sub-region, and calculate a value of light intensity according to the light intensity data; the value of light intensity is used as the value of first light intensity P1.

Sub-step 3062: a brightness value of a current pattern displayed in the light intensity detection sub-region of the display is obtained, and a value of second light intensity is calculated according to the brightness value of the current pattern; the value of second light intensity indicates that the light intensity detection sub-region is affected by the brightness of the current pattern.

Specifically, during use of the terminal by a user, different patterns may be displayed by the display of the terminal. The patterns displayed on the display also generate light rays that illuminate the light intensity detection sub-region of the optical fingerprint sensor. Affected by the light rays that illuminate the light intensity detection sub-region, light intensity affected by the brightness of the current pattern can be detected in the light intensity detection sub-region, and the detected light intensity is used as second light intensity P2.

A manner of calculating a value of the second light intensity P2 is: P2=K*L, P2 is the value of second light intensity, K is a predetermined coefficient corresponding to the display, and L is the brightness value of the current pattern. When the user uses the terminal to browse different content, the operating system controls the display to display patterns of different brightness value L according to the content browsed by the user, so that the in-display light intensity detection middleware can obtain a specific brightness value L of the current pattern from the operating system, to calculate the value of second light intensity P2.

Figure 6:
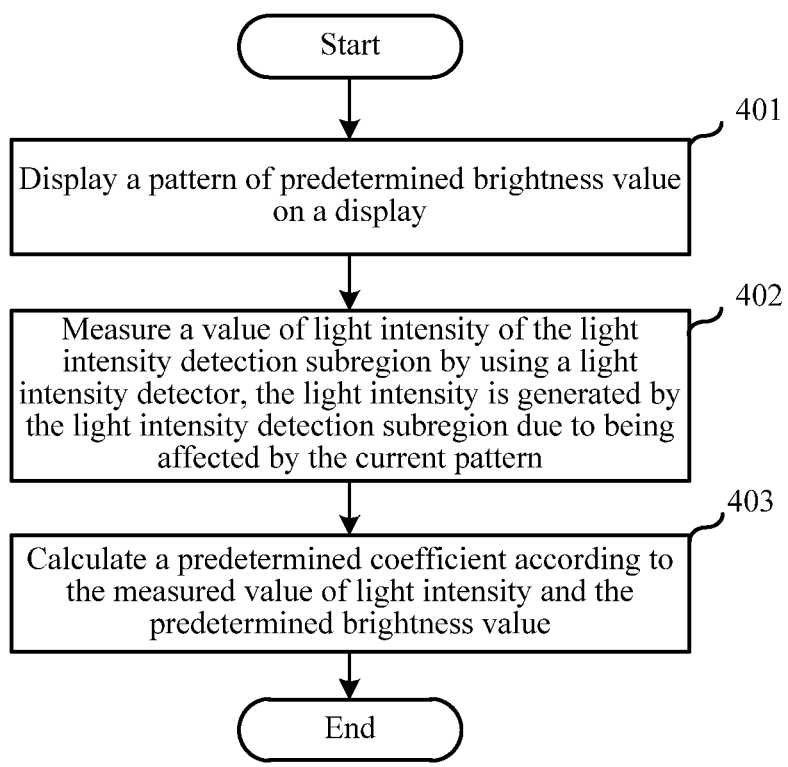
FIG. 6 is a specific flowchart of a manner for determining a predetermined coefficient corresponding to a display according to the third embodiment of this application.

In this embodiment, the predetermined coefficient K corresponding to the display is a coefficient related to the display. Displays having a same structure correspond to a same value of K. Generally, a value of K is measured before an optical fingerprint sensor is installed below a display during manufacturing the display. Referring to FIG. 6, FIG. 6 is a specific flowchart of a manner for determining the predetermined coefficient K corresponding to the display, specifically includes the follows steps.

Step 401: a pattern of predetermined brightness value is displayed on the display.

Specifically, the operating system controls the display to display a pattern of predetermined brightness value A at least in the optical detection region (or on the entire display).

Step 402: a value of light intensity of the light intensity detection sub-region is measured by using a light intensity detector, the light intensity is generated by the light intensity detection sub-region due to being affected by the current pattern.

Specifically, the light intensity detector is placed in the light intensity detection sub-region below the display (at this time, the optical fingerprint sensor is not installed below the display), so as to measure a value of light intensity B of the light intensity detection sub-region, which is generated due to being affected by the current pattern.

Step 403: the predetermined coefficient is calculated according to the measured value of light intensity and the predetermined brightness value.

Specifically, the predetermined coefficient K may be calculated by using the measured value of light intensity B and the predetermined brightness value A according to the following formula: K=B/A; K is the predetermined coefficient, B is the value of light intensity of the light intensity detection sub-region, which is generated due to being affected by the current pattern, and A is the predetermined brightness value of the pattern.

Sub-step 3063: the value of ambient light intensity is calculated according to the value of first light intensity and the value of second light intensity.

Specifically, the value of light intensity that is calculated by using the light intensity data collected by the optical fingerprint sensor (that is, the value of first light intensity P1), includes the value of light intensity generated in the light intensity detection sub-region by light of the current pattern on the display(that is, the value of second light intensity P2), and the value of light intensity (represented by P) generated in the light intensity detection sub-region by ambient light. Therefore, the value of ambient light intensity P=P1−P2, P1 is the value of first light intensity, and P2 is the value of second light intensity. In sub-step 3061 and sub-step 3062, the value of first light intensity P1 and the value of second light intensity P2 are calculated, such that the value of ambient light intensity P can be calculated.

Compared with the second embodiment, this embodiment describes a specific implementation of processing the collected light intensity data, and calculating the value of current ambient light intensity according to the light intensity data. It should be noted that, this embodiment may also be detailed based on the first embodiment, and can achieve same technical effects.

Figure 7:
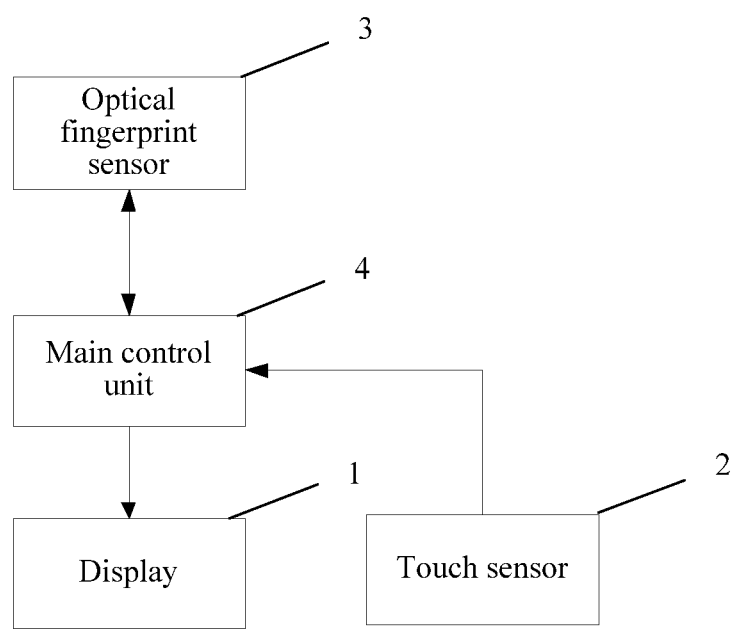
FIG. 7 is a schematic block diagram of a light intensity detection apparatus according to a fourth embodiment of this application.

A fourth embodiment of this application relates to a light intensity detection apparatus, applied to an intelligent terminal. For example, the intelligent terminal may be a mobile intelligent terminal device such as a mobile phone, a tablet computer or the like; the intelligent terminal may alternatively bean intelligent electronic apparatus of another type. Referring to FIG. 7, the light intensity detection apparatus includes a display 1, a touch sensor 2, an optical fingerprint sensor 3, and a main control unit 4.

In an optional implementation, in this embodiment, the main control unit 4 may implement the following functions by an in-display light intensity detection middleware configured in an operating system of the light intensity detection apparatus. It should be understood that, in another alternative implementation, the main control unit may implement the following functions in another manner. This is not limited in this application.

Figure 8A:
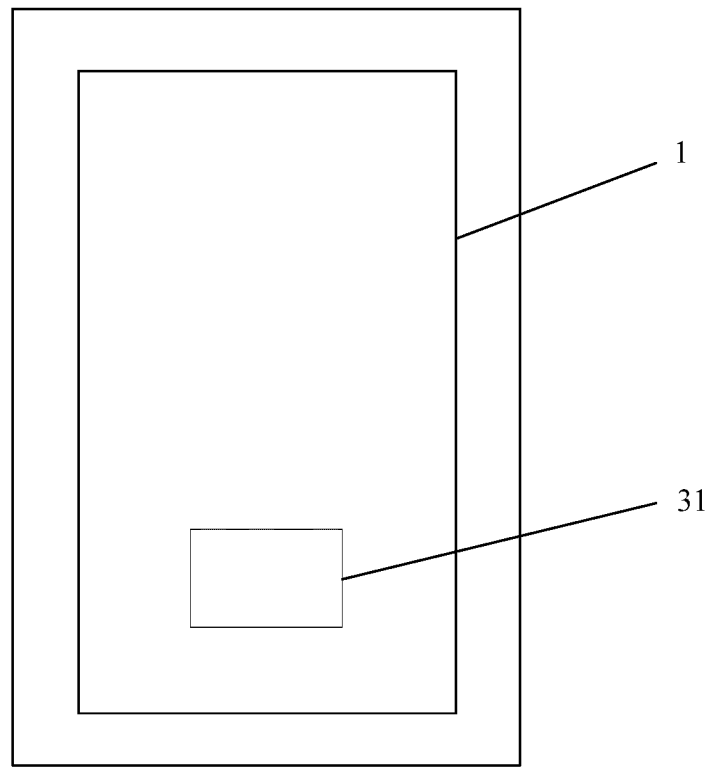
FIG. 8a is a top view of the light intensity detection apparatus according to the fourth embodiment of this application.
Figure 8B:
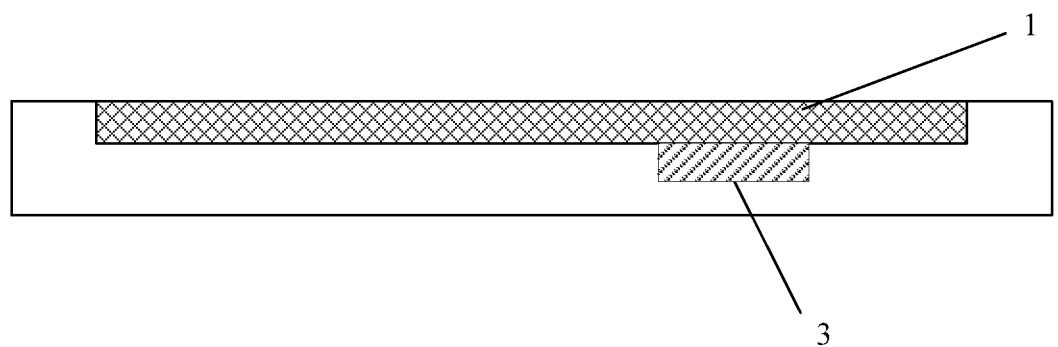
FIG. 8b is a cross-sectional view of a side surface of the light intensity detection apparatus according to the fourth embodiment of this application.

Referring to FIG. 8a and FIG. 8b, FIG. 8a and FIG. 8b are respectively a top view and a cross-sectional view of a side surface of the light intensity detection apparatus. The optical fingerprint sensor 3 is arranged corresponding to an optical detection region 31. The optical detection region 31 of the optical fingerprint sensor 3 is arranged in at least a part of a display region of the display 1. The optical detection region 31 includes a fingerprint detection sub-region and a light intensity detection sub-region. The fingerprint detection sub-region includes a plurality of sensing units for performing a fingerprint detection function; and the light intensity detection sub-region includes at least one sensing unit for performing a light intensity detection function. The touch sensor 2 is installed above the display 1 or is integrated in the display, and at least covers the optical detection region 31.

The main control unit 4 determines whether light intensity detection needs to be performed by using an in-display light intensity detection middleware in the operating system. When determining that light intensity detection needs to be performed, the main control unit 4 determines whether there is a finger touch in the optical detection region 31 of the display 1 by using detection of the touch sensor 2 or the optical fingerprint sensor 3. When detecting that there is no finger touch, the main control unit 4 enables the light intensity detection function of the optical fingerprint sensor 3.

The main control unit 4 is further configured to detect whether there is a finger touch in the optical detection region 31 of the display, and wake up the optical fingerprint sensor 3 by using the in-display light intensity detection middleware in the operating system when detecting that there is no finger touch, to enable the light intensity detection function of the optical fingerprint sensor 3.

The optical detection region 31 of the optical fingerprint sensor 3 includes the light intensity detection sub-region 311 and the fingerprint detection sub-region 312. The optical fingerprint sensor 3 is configured to collect light intensity data in the light intensity detection sub-region 311 of the optical detection region 31 after the light intensity detection function is enabled, and upload the light intensity data to the main control unit 4 to calculate a value of current ambient light intensity. In an optional embodiment, the optical fingerprint sensor 3 may use at least some pixel units of the display 1 as light sources.

Figure 9:
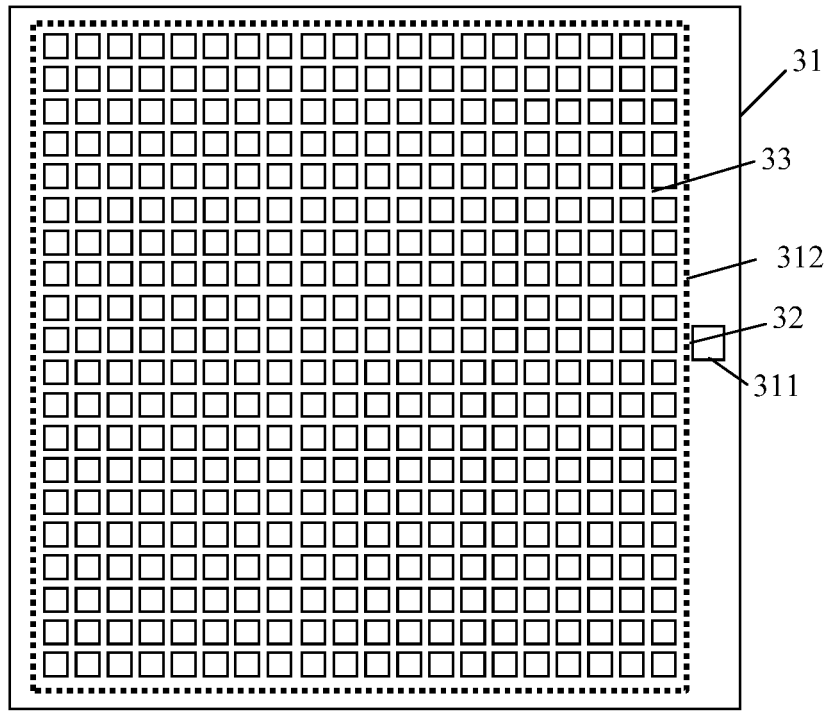
FIG. 9 is a schematic diagram of distribution of sensing units of an optical fingerprint sensor according to the fourth embodiment of this application.

In this embodiment, a sensing unit (at least one) is additionally arranged outside the fingerprint detection sub-region 312 to form the light intensity detection sub-region 311, and the sensing unit is configured to perform light intensity detection. For example, the sensing unit (that is, a light intensity detection unit) in the light intensity detection sub-region 311 may be arranged outside the fingerprint detection sub-region 312, and is adjacent to a sensing unit in an outermost region of the fingerprint detection sub-region 312. In addition, a sensing unit in the light intensity detection sub-region 311 and a sensing unit (that is, a fingerprint detection unit) in the fingerprint detection sub-region 312 are independent of each other both in structure and function. Specifically, referring to FIG. 9, the optical fingerprint sensor includes at least one first sensing unit 32 (in the figure, the optical fingerprint sensor includes one first sensing unit is used as an example, but this is not limited) and a plurality of second sensing units 33. The first sensing unit 32 is arranged in the light intensity detection sub-region 311, and is configured to perform the light intensity detection function. The plurality of second sensing units is arranged in the fingerprint detection sub-region 312, and is configured to perform the fingerprint detection function. The at least one first sensing unit 32 is independently disposed outside the plurality of second sensing units 33. That is, a first sensing unit 32, which is dedicated for performing ambient light intensity detection, is integrated beside the fingerprint detection sub-region 312, and is used as a sensing unit (that is, a light intensity detection unit) of the light intensity detection sub-region 311. When fingerprint detection is performed, the optical fingerprint sensor 3 uploads fingerprint data collected by the plurality of second sensing units 33 in the fingerprint detection sub-region 312 to the main control unit 4, so that the main control unit 4 performs identity authentication. When ambient light intensity detection needs to be performed, the optical fingerprint sensor 3 uploads light intensity data that is collected by the first sensing unit 32 for performing ambient light intensity detection to the main control unit 4. A light intensity calculation module may be configured in the main control unit 4. After receiving the light intensity data uploaded by the optical fingerprint sensor 3, the main control unit 4 may process the light intensity data and calculate a value of current ambient light intensity by using the light intensity calculation module.

Figure 10:
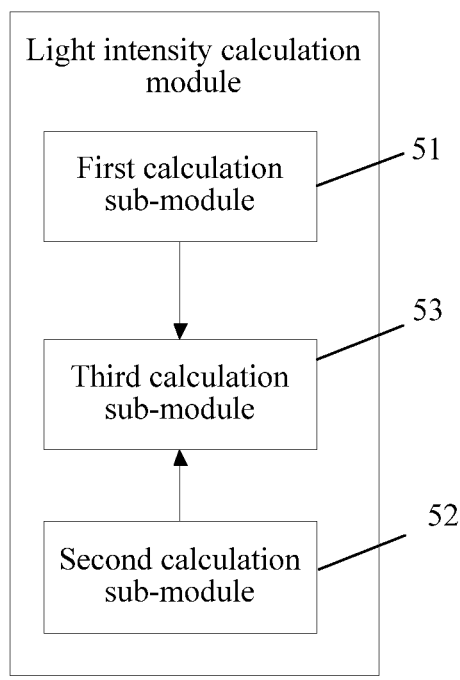
FIG. 10 is a schematic block diagram of a light intensity calculation module according to the fourth embodiment of this application.

Referring to FIG. 10, in an optional implementation, the light intensity calculation module may include a first calculation sub-module 51, a second calculation sub-module 52, and a third calculation sub-module 53.

The first calculation sub-module 51 is configured to process the collected light intensity data, and calculate a value of first light intensity according to the light intensity data.

The second calculation sub-module 52 is configured to obtain brightness value of a current pattern displayed in the light intensity detection sub-region 311 of the display 1; and calculate a value of second light intensity according to the brightness value of the current pattern, the value of second light intensity indicating a degree that the light intensity detection sub-region 311 is affected by the brightness of the current pattern.

A manner of calculating a value of the second light intensity P2 is: $P2=K*L$, K is the predetermined coefficient corresponding to the display, and L is the brightness value of the current pattern.

A manner of calculating the predetermined coefficient includes: displaying a pattern of predetermined brightness on the display 1; measuring a value of light intensity by using a light intensity detector, the value of light intensity being generated by the light intensity detection sub-region 311 due to being affected by a current pattern; and calculating the predetermined coefficient according to the measured value of light intensity and the predetermined brightness value.

The third calculation submodule 53 calculates the value of ambient light intensity according to the value of first light intensity and the value of second light intensity.

The main control unit 4 may be further configured to control the optical fingerprint sensor 3 to enter a power saving mode by using the in-display light intensity detection middleware in the operating system, after the optical fingerprint sensor 3 collects light intensity data in the light intensity detection sub-region 311 of the optical detection region 31.

Compared with the existing art, in this embodiment, an optical fingerprint sensor is arranged below a display, and a light intensity detection function is implemented by using the optical fingerprint sensor. Therefore, there is no need to additionally provide a light sensor in the intelligent terminal, which might otherwise occupy an area of a front surface of a housing, and accordingly, a screen-to-body ratio of the intelligent terminal can be increased.

A fifth embodiment of this application relates to a light intensity detection apparatus. This embodiment is improved based on the fourth embodiment. The main improvement is that: in this embodiment, some sensing units in the fingerprint detection sub-region 312 are selected as light intensity detection units, and a sensing unit (at least one) is additionally arranged outside the fingerprint detection sub-region 312 as light intensity detection units, so as to form the light intensity detection sub-region 311 for light intensity detection.

Figure 11:
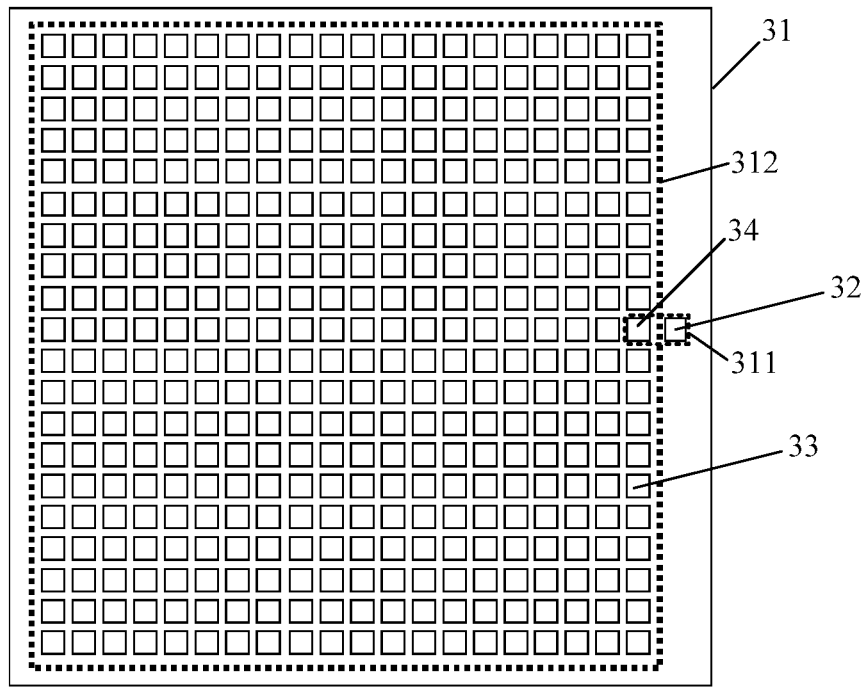
FIG. 11 is a schematic diagram of distribution of sensing units of an optical fingerprint sensor according to a fifth embodiment of this application.

In this embodiment, referring to FIG. 11, the optical fingerprint sensor further includes at least one third sensing unit 34 (in the figure, that the optical fingerprint sensor includes one third sensing unit 34 is used as an example, but this is not limited). The light intensity detection sub-region 311 is cooperatively formed by at least one first sensing unit 32 (in the figure, one first sensing unit 32 is used as an example) and at least one third sensing unit 34. The fingerprint detection sub-region 312 of the optical detection region 31 is formed by a plurality of second sensing units 33 and the at least one third sensing unit 34. When fingerprint detection is performed, the optical fingerprint sensor uploads fingerprint data collected by the plurality of second sensing units 33 and the third sensing unit 34 in the fingerprint detection sub-region 312 to the operating system, so that the operating system performs identity authentication. When ambient light intensity detection needs to be performed, the optical fingerprint sensor uploads light intensity data collected by the first sensing unit 32 and the third sensing unit 34 that are configured to perform ambient light intensity detection to the main control unit 4, so that the light intensity calculation module of the main control unit 4 processes the light intensity data and calculates a value of ambient light intensity.

Compared with the fourth embodiment, this embodiment provides another structure of the optical fingerprint sensor.

A sixth embodiment of this application relates to a light intensity detection apparatus. This embodiment is substantially the same as the fourth embodiment, and the main difference is that: in this embodiment, some sensing units (at least one) in the fingerprint detection sub-region 312 are configured to form the light intensity detection sub-region 311 for light intensity detection. For example, the sensing units in the light intensity detection sub-region 311 may be integrally arranged in the fingerprint detection sub-region 312. That is, the at least some sensing units in the fingerprint detection sub-region 312 are further used as sensing units in the light intensity detection sub-region 311, and the at least some sensing units have both the fingerprint detection function and the light intensity detection function.

Figure 12:
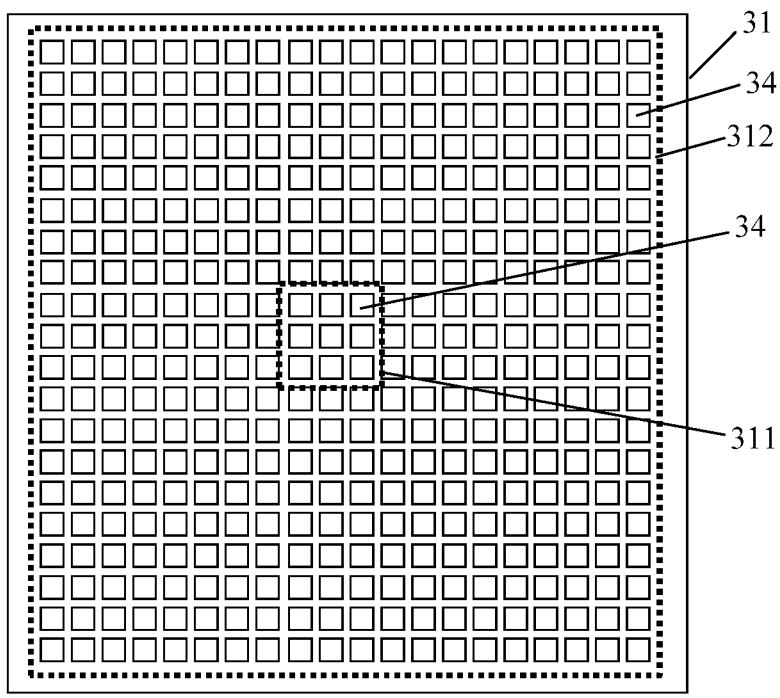
FIG. 12 is a schematic diagram of distribution of sensing units of an optical fingerprint sensor according to a sixth embodiment of this application.

In this embodiment, referring to FIG. 12, the optical fingerprint sensor includes a plurality of fourth sensing units 35, and at least one of the plurality of fourth sensing units 35 forms the light intensity detection sub-region 311 (in the figure, that nine fourth sensing units 35 form the light intensity detection sub-region 311 is used as an example, but this is not limited). The nine fourth sensing units 34 cooperatively form the light intensity detection sub-region 311, and a plurality of fourth sensing units 35 forms the fingerprint detection sub-region 312 in the optical detection region 31. That is, fingerprint detection and light intensity detection that are performed by the sensing units are based on a same principle, thus the fourth sensing unit 35 may also be configured to detect light intensity. Therefore, some fourth sensing units 35 (in the figure, that there are nine fourth sensing units 35 is used as an example, but this is not limited) of the plurality of fourth sensing units 35 may be configured to perform both fingerprint detection and ambient light intensity detection, so as to implement both the fingerprint detection function and the light intensity detection function without changing the existing optical fingerprint sensor, and reduce power consumption.

When fingerprint detection is performed, the optical fingerprint sensor uploads fingerprint data collected by the nine fourth sensing units 35 and the plurality of fourth sensing units 35 in the fingerprint detection sub-region 312 to the operating system, so that the operating system performs identity authentication. When ambient light intensity detection needs to be performed, the optical fingerprint sensor uploads light intensity data collected by the nine fourth sensing units 35 in the fingerprint detection sub-region 312 to the main control unit 4, so that the light intensity calculation module of the main control unit processes the light intensity data and calculates a value of ambient light intensity.

Compared with the fourth embodiment, this embodiment further provides a specific implementation of the optical fingerprint sensor, so as to reduce power consumption and reduce an arithmetic quantity of data.

A seventh embodiment of this application relates to an intelligent terminal. For example, the intelligent terminal may be a mobile intelligent terminal device such as a mobile phone, a tablet computer or the like, or the intelligent terminal may be an intelligent electronic apparatus of another type. In this embodiment, referring to FIG. 7, the intelligent terminal includes the light intensity detection apparatus in any one of the fourth embodiment to the sixth embodiment.

Compared with the existing art, in this embodiment, an optical fingerprint sensor is arranged below a display, and a light intensity detection function is implemented by using the optical fingerprint sensor. Therefore, there is no need to additionally provide a light sensor in the intelligent terminal, which might otherwise occupy an area of a front surface of a housing, and accordingly, a screen-to-body ratio of the intelligent terminal can be increased.

A person of ordinary skill in the art may understand that the foregoing embodiments are specific embodiments for implementing this application, and in actual application, various variations may be made to the embodiments in form and detail without departing from the spirit and the scope of this application.

What is claimed is:

1. A method for detecting ambient light intensity, comprising:
   determining whether light intensity detection needs to be performed;
   detecting whether there is a finger touch in an optical detection region of an optical fingerprint sensor if light intensity detection needs to be performed, wherein the optical detection region is located in at least a part of a display region of a display;
   enabling a light intensity detection function if no finger touch is detected, and collecting light intensity data by using the optical fingerprint sensor; and
   processing the collected light intensity data, and calculating a value of current ambient light intensity according to the light intensity data;
   wherein processing the collected light intensity data, and calculating a value of current ambient light intensity according to the light intensity data comprises: processing the collected light intensity data, and calculating a value of first light intensity according to the light intensity data; obtaining a brightness value of a current pattern displayed in a light intensity detection sub-region of the display, and calculating a value of second light intensity according to the brightness value of the current pattern, wherein the value of second light intensity indicates that the light intensity detection sub-region is affected by the brightness of the current pattern; and calculating the value of ambient light intensity according to the value of first light intensity and the value of second light intensity; and wherein a value of the second light intensity P2 is calculated by: P2=K*L, wherein K is a predetermined coefficient corresponding to the display, and L is the brightness value of the current pattern.

2. The method according to claim 1, wherein before the enabling a light intensity detection function, the method further comprises:

waking up the optical fingerprint sensor, to enable the light intensity detection function of the optical fingerprint sensor; and wherein the optical fingerprint sensor has both a fingerprint detection function and the light intensity detection function.

3. The method according to claim 2, wherein after the enabling the light intensity detection function and collecting light intensity data, the method further comprises:

controlling the optical fingerprint sensor to enter a power saving mode.

4. The method according to claim 1, wherein the predetermined coefficient K corresponding to the display is determined by a manner comprising:

displaying a pattern of predetermined brightness value on the display;

measuring, by using a light intensity detector, a value of light intensity of the light intensity detection sub-region, the light intensity being generated by the light intensity detection sub-region due to being affected by the current pattern; and calculating the predetermined coefficient according to the measured value of light intensity and the predetermined brightness value.

5. The method according to claim 1, wherein the optical detection region of the optical fingerprint sensor includes a fingerprint detection sub-region and a light intensity detection sub-region, wherein the optical fingerprint sensor performs the fingerprint detection function by using sensing units in the fingerprint detection sub-region, and performs the light intensity detection function by using at least one sensing unit in the light intensity detection sub-region.

6. The method according to claim 5, wherein the at least one sensing unit in the light intensity detection sub-region is independently arranged outside the fingerprint detection sub-region.

7. The method according to claim 5, wherein at least some sensing units in the fingerprint detection sub-region are further used as sensing units in the light intensity detection sub-region, and the at least some sensing units have both the fingerprint detection function and the light intensity detection function.

8. An apparatus for detecting ambient light intensity, comprising a display, an optical fingerprint sensor, and a main control unit, wherein an optical detection region of the optical fingerprint sensor is arranged in at least a part of a display region of the display;

the main control unit is configured to enable a light intensity detection function of the optical fingerprint sensor when the main control unit determines that light intensity detection needs to be performed, and there is no finger touch in the optical detection region of the display; and the optical fingerprint sensor is configured to collect light intensity data after the light intensity detection function is enabled, and upload the light intensity data to the main control unit to calculate a value of current ambient light intensity;

wherein a light intensity calculation module is configured in the main control unit, and the light intensity calculation module comprises: a first calculation sub-module, configured to process the collected light intensity data, and calculate a value of first light intensity according to the light intensity data; a second calculation sub-module, configured to obtain brightness value of a current pattern displayed in the light intensity detection sub-region of the display, and calculate a value of second light intensity according to the brightness value of the current pattern, wherein the value of second light intensity indicates a degree that the light intensity detection sub-region is affected by the brightness of the current pattern; and a third calculation sub-module, configured to calculate the value of ambient light intensity according to the value of first light intensity and the value of second light intensity; and wherein a value of the second light intensity is calculated by: P2=K*L, wherein P2 is the value of second light intensity, K is a predetermined coefficient corresponding to the display, and L is the brightness value of the current pattern.

9. The apparatus according to claim 8, wherein the optical detection region of the optical fingerprint sensor includes a fingerprint detection sub-region and a light intensity detection sub-region.

10. The apparatus according to claim 9, wherein the optical fingerprint sensor includes at least one first sensing unit and a plurality of second sensing units, wherein the at least one first sensing unit is arranged in the light intensity detection sub-region, and is configured to perform the light intensity detection function; and the plurality of second sensing units is arranged in the fingerprint detection sub-region, and is configured to perform a fingerprint detection function; wherein the at least one first sensing unit is independently arranged outside the plurality of second sensing units.

11. The apparatus according to claim 10, wherein the optical fingerprint sensor further includes at least one third sensing unit, the light intensity detection sub-region is formed by the at least one first sensing unit and the at least one third sensing unit, and the fingerprint detection sub-region of the optical detection region is formed by the plurality of second sensing units and the at least one third sensing unit.

12. The apparatus according to claim 8, wherein the optical fingerprint sensor includes a plurality of sensing units, and at least some sensing units have both a fingerprint detection function and the light intensity detection function.

13. The apparatus according to claim 8, wherein the main control unit is further configured to detect whether there is a finger touch in the optical detection region of the display, and wake up the optical fingerprint sensor to enable the light intensity detection function of the optical fingerprint sensor when detecting there is no finger touch.

14. The apparatus according to claim 13, wherein the main control unit is further configured to control the optical fingerprint sensor to enter a power saving mode after the optical fingerprint sensor collects the light intensity data in the light intensity detection sub-region of the optical detection region.

15. The apparatus according to claim 8, wherein the predetermined coefficient is determined by:
displaying a pattern of predetermined brightness value on the display;
measuring, by using a light intensity detector, a value of light intensity of the light intensity detection sub-region, the light intensity being generated by the light intensity detection sub-region due to being affected by the current pattern; and
calculating the predetermined coefficient according to the measured value of light intensity and the predetermined brightness value.

16. An intelligent device, comprising an apparatus for detecting ambient light intensity; wherein the apparatus comprises a display, an optical fingerprint sensor, and a main control unit, wherein
an optical detection region of the optical fingerprint sensor is arranged in at least a part of a display region of the display;
the main control unit is configured to enable a light intensity detection function of the optical fingerprint sensor when the main control unit determines that light intensity detection needs to be performed, and there is no finger touch in the optical detection region of the display; and the optical fingerprint sensor is configured to collect light intensity data after the light intensity detection function is enabled, and upload the light intensity data to the main control unit to calculate a value of current ambient light intensity;

wherein a light intensity calculation module is configured in the main control unit, and the light intensity calculation module comprises: a first calculation sub-module, configured to process the collected light intensity data, and calculate a value of first light intensity according to the light intensity data; a second calculation sub-module, configured to obtain brightness value of a current pattern displayed in the light intensity detection sub-region of the display, and calculate a value of second light intensity according to the brightness value of the current pattern, wherein the value of second light intensity indicates a degree that the light intensity detection sub-region is affected by the brightness of the current pattern; and a third calculation sub-module, configured to calculate the value of ambient light intensity according to the value of first light intensity and the value of second light intensity; and wherein a value of the second light intensity is calculated by: $P2=K*L$, wherein P2 is the value of second light intensity, K is a predetermined coefficient corresponding to the display, and L is the brightness value of the current pattern.

* * * * *